(12) United States Patent
Kimura (10) Patent No.: US 7,292,938 B2
(45) Date of Patent: Nov. 6, 2007

(54) POSITION LOCATING SYSTEM, TERMINAL DEVICE, CONTROL METHOD FOR TERMINAL DEVICE, CONTROL PROGRAM FOR TERMINAL DEVICE, AND COMPUTER READABLE RECORD MEDIUM STORING CONTROL PROGRAM FOR TERMINAL DEVICE THEREIN

(75) Inventor: Akira Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 11/191,036

(22) Filed: Jul. 28, 2005

(65) Prior Publication Data

US 2006/0025926 A1  Feb. 2, 2006

(30) Foreign Application Priority Data

Jul. 29, 2004 (JP) ............... 2004-221409

(51) Int. Cl.
*G01S 5/14* (2006.01)
*G01C 21/00* (2006.01)

(52) U.S. Cl. ............. 701/213; 701/200; 342/357.02; 342/357.12

(58) Field of Classification Search ............... 701/213, 701/200; 342/357.02, 357.12
See application file for complete search history.

(56) References Cited

U.S. PATENT DOCUMENTS

| | | | | |
|---|---|---|---|---|
| 4,221,975 A | * | 9/1980 | Ledniczki et al. | 307/116 |
| 4,701,760 A | * | 10/1987 | Raoux | 340/993 |
| 4,897,642 A | * | 1/1990 | DiLullo et al. | 340/10.41 |
| 5,043,736 A | * | 8/1991 | Darnell et al. | 342/357.1 |
| 5,155,689 A | * | 10/1992 | Wortham | 455/456.3 |
| 5,557,254 A | * | 9/1996 | Johnson et al. | 340/426.19 |
| 5,673,305 A | * | 9/1997 | Ross | 455/517 |
| 5,742,509 A | * | 4/1998 | Goldberg et al. | 701/211 |

(Continued)

FOREIGN PATENT DOCUMENTS

BR    9912917 A  *  5/2001

(Continued)

OTHER PUBLICATIONS

A. Bulut et al., Distributed data streams indexing using content-based routing paradigm, Proceedings, 19th IEEE International Parallel and distributed processing symposium Apr. 6-8, 2005, p. 94.*

(Continued)

*Primary Examiner*—Cuong Nguyen
(74) *Attorney, Agent, or Firm*—Global IP Counselors, LLP (57) ABSTRACT

A terminal device 50 includes aid-information acquisition device to acquire aid information 154 from an information providing apparatus, an information-providing-apparatus-sort judgment device to judge the type of information providing apparatus on the basis of positioning charge information 154a contained in the aid information 154, a positioning-basis-information generation device to generate positioning basis information 156 on the basis of position-relevant signals, a terminal-located-result-information generation device to locate a current position on the basis of the positioning basis information 156 to generate terminal-located position information and signal reception time information indicating signal reception times of the position-relevant signals, and a positioning-basis-information correction to correct the positioning basis information 156 on the basis of the signal reception time information to generate corrected positioning basis information 162.

20 Claims, 4 Drawing Sheets

U.S. PATENT DOCUMENTS

| | | | | |
|---|---|---|---|---|
| 5,777,580 | A | * | 7/1998 | Janky et al. ............... 342/457 |
| 5,786,789 | A | * | 7/1998 | Janky ..................... 342/357.1 |
| 5,841,396 | A | * | 11/1998 | Krasner ............... 342/357.02 |
| 5,874,914 | A | * | 2/1999 | Krasner ............... 342/357.12 |
| 5,884,221 | A | * | 3/1999 | Wortham ................. 701/300 |
| 5,913,170 | A | * | 6/1999 | Wortham ................. 455/457 |
| 5,917,405 | A | * | 6/1999 | Joao ..................... 340/426.17 |
| 5,922,640 | A | * | 7/1999 | Hirai et al. ............... 502/401 |
| 5,959,577 | A | * | 9/1999 | Fan et al. ............. 342/357.13 |
| 5,987,377 | A | * | 11/1999 | Westerlage et al. ......... 701/204 |
| 6,014,080 | A | * | 1/2000 | Layson, Jr. ............. 340/573.1 |
| 6,064,336 | A | * | 5/2000 | Krasner ............... 342/357.05 |
| 6,131,067 | A | * | 10/2000 | Girerd et al. ............. 701/213 |
| 6,148,261 | A | * | 11/2000 | Obradovich et al. ........ 701/208 |
| 6,204,807 | B1 | * | 3/2001 | Odagiri et al. ......... 342/357.06 |
| 6,204,808 | B1 | * | 3/2001 | Bloebaum et al. ..... 342/357.07 |
| 6,208,290 | B1 | * | 3/2001 | Krasner ............... 342/357.05 |
| 6,295,449 | B1 | * | 9/2001 | Westerlage et al. ...... 455/422.1 |
| 6,427,120 | B1 | | 7/2002 | Garin et al. |
| 6,510,381 | B2 | * | 1/2003 | Grounds et al. ............ 701/207 |
| 2001/0034577 | A1 | * | 10/2001 | Grounds et al. ............ 701/207 |
| 2002/0072378 | A1 | | 6/2002 | Gaal |
| 2002/0075182 | A1 | | 6/2002 | Sheynblat |
| 2003/0104823 | A1 | | 6/2003 | Ono |
| 2005/0015316 | A1 | * | 1/2005 | Salluzzo ..................... 705/30 |
| 2005/0141997 | A1 | * | 6/2005 | Rast ....................... 416/229 R |
| 2006/0025926 | A1 | * | 2/2006 | Kimura ..................... 701/213 |
| 2006/0080631 | A1 | * | 4/2006 | Koo ........................... 716/17 |
| 2006/0273954 | A1 | * | 12/2006 | Diggelen ............... 342/357.02 |

FOREIGN PATENT DOCUMENTS

| | | | |
|---|---|---|---|
| CN | 1727910 A | * | 2/2006 |
| DE | 69729737 E | * | 8/2004 |
| EP | 1621895 A1 | * | 2/2006 |
| JP | 2002-507727 A | | 3/2002 |
| JP | 2002-522795 A | | 7/2002 |
| JP | 2002-228738 A | | 8/2002 |
| JP | 2002-303665 A | | 10/2002 |
| JP | 2004-504614 A | | 2/2004 |
| JP | 2004-507186 A | | 3/2004 |
| JP | 2006038734 A | * | 2/2006 |
| WO | WO9825157 A2 | * | 6/1998 |
| WO | WO-99/47943 A1 | | 9/1999 |
| WO | WO-00/10031 A1 | | 2/2000 |
| WO | WO 200010028 A1 | * | 2/2000 |
| WO | WO-02/15612 A1 | | 2/2002 |

OTHER PUBLICATIONS

The effectiveness of global positioning system electronic navigation Wright, M.; Stallings, D.; Dunn, D.; SoutheastCon, 2003. Proceedings. IEEE Apr. 4-6, 2003 pp. 62-67.*

A Positioning Technology for Classically Difficult GNSS Environments from Locata Barnes, J.; Rizos, C.; Kanli, M.; Pahwa, A.; Position, Location, And Navigation Symposium, 2006 IEEE/ION Apr. 25-27, 2006 pp. 715-721.*

A Reliable Spaceborne Memory with a Single Error and Erasure Correction Scheme Walker, W.K.S.; Sundberg, C.-E.W.; Black, C.J.; Computers, IEEE Transactions on vol. C-28, Issue 7, Jul. 1979 pp. 493-500.*

A method for dead reckoning parameter correction in pedestrian navigation system Jirawimut, R.; Ptasinski, P.; Garaj, V.; Cecelja, F.; Balachandran, W.; Instrumentation and Measurement, IEEE Transactions on vol. 52, Issue 1, Feb. 2003 pp. 209-215.*

Differential GPS/inertial navigation approach/landing flight test results Snyder, S.; Schipper, B.; Vallot, L.; Parker, N.; Spitzer, C.; Aerospace and Electronic Systems Magazine, IEEE vol. 7, Issue 5, May 1992 pp. 3-11.*

3GPP2, Position Determination Service Standard for Dual Mode Spectrum Systems, Feb. 16, 2001, Version3.0.

* cited by examiner

POSITION LOCATING SYSTEM, TERMINAL DEVICE, CONTROL METHOD FOR TERMINAL DEVICE, CONTROL PROGRAM FOR TERMINAL DEVICE, AND COMPUTER READABLE RECORD MEDIUM STORING CONTROL PROGRAM FOR TERMINAL DEVICE THEREIN

CROSS-REFERENCE TO RELATED APPLICATIONS

This application claims priority to Japanese Patent Application No. 2004-221409. The entire disclosure of Japanese Patent Application No. 2004-221409 is hereby incorporated herein by reference.

BACKGROUND OF THE INVENTION

1. Field of the Invention

The present invention generally relates to a position locating system. More specifically, the present invention relates to a position locating system, a terminal device, a control method for a terminal device, a control program for a terminal device, and a computer-readable record medium being configured to store a control program for a terminal device, with regards to positioning based on signals from positional information satellites.

2. Background Information

Heretofore, a position locating system wherein the current position of an SPS receiver is located by utilizing a satellite navigation system, for example, an SPS (Satellite positioning system) has been put into practical use. Herein, a so-called "assisted type" wherein the SPS receiver acquires aid information for the position location from external apparatuses by radio is extensively utilized. This type of structure is shown in Japanese Laid-Open Patent Publication JP-A-2002-228738, especially FIG. 1. JP-A-2002-228738 hereby incorporated by reference.

The above external apparatuses, however, are of a plurality of sorts and provide the aid information in conformity with different rules or protocols. Accordingly, even if the SPS receiver is constructed to be capable of acquiring the aid information from a certain specified external apparatus, there is sometimes a problem that when the SPS receiver leaves the service area of the external apparatus and enters the service area of an external apparatus of another sort, it cannot acquire the aid information. In contrast, when the SPS receiver includes constructions conforming to all the different individual external apparatuses, there is a problem in that a position locating chip becomes expensive.

In view of the above, it will be apparent to those skilled in the art from this disclosure that there exists a need for an improved position locating system, a terminal device, a control method for a terminal device, a control program for a terminal device, and a computer-readable record medium being configured to store a control program for a terminal device, with regards to positioning based on signals from positional information satellites. This invention addresses this need in the art as well as other needs, which will become apparent to those skilled in the art from this disclosure.

SUMMARY OF THE INVENTION

An object of the present invention is to provide, a position locating system, a terminal device, a control method for a terminal device, a control program for a terminal device, and a computer-readable record medium that stores a control program for a terminal device that can utilize aid information from a plurality of different external apparatuses without raising costs.

According to a first aspect of the present invention, the object is accomplished by a position locating system having a terminal device and a plurality of different information providing apparatuses. The terminal device acquires a located result of a current position based on position-relevant signals from positional information satellites. The plurality of different information providing apparatuses provide aid information to the terminal device. The aid information contains positioning charge information that indicates whether or not the information providing apparatus determines the location of the current position. Further, the terminal device includes an aid-information acquisition device, an information-providing-apparatus-sort judgment device, a position-relevant-signal reception device, a positioning-basis-information generation device, a terminal-located-result-information generation device, a positioning-basis-information correction device, a corrected-positioning-basis-information transmission device, an information-providing-apparatus-located-position-information acquisition device, and a located-position-information output device. The aid-information acquisition device acquires the aid information from the information providing apparatus. The information-providing-apparatus-sort judgment device judges a particular information providing apparatus on the basis of the positioning charge information contained in the aid information. The position-relevant-signal reception device receives the position-relevant signals on the basis of the aid information. The positioning-basis-information generation device generates positioning basis information on the basis of the position-relevant signals. The terminal-located-result-information generation device determines the location of the current position on the basis of the positioning basis information to generate terminal-located position information and signal reception time information that indicates signal reception times of the position-relevant signals. The positioning-basis-information correction device corrects the positioning basis information on the basis of the signal reception time information to generate corrected positioning basis information. The corrected-positioning-basis-information transmission device transmits the corrected positioning basis information to the information providing apparatus on the basis of a judged result of the information-providing-apparatus-sort judgment device. The information-providing-apparatus-located-position-information acquisition device acquires information-providing-apparatus-located position information that indicates a location result based on the corrected positioning basis information as has been performed by the information providing apparatus. The located-position-information output device outputs the terminal-located position information or the information-providing-apparatus-located position information on the basis of a judged result of the information-providing-apparatus-sort judgment device.

When the positioning charge information indicates that the information providing apparatus determines the position location, the terminal device receives an information providing service of the so-called "Assisted type." According to a protocol in this case, the terminal device is required, for example, to "catch" the positional information satellites on the basis of the aid information from the information providing apparatus to transmit to the information providing apparatus the positioning basis information that indicates the distances (hereinafter, termed "pseudo range") between the terminal device and the individual positional information satellites, and to output the information-providing-apparatus-located position information that has been generated by the position location of the information providing apparatus.

In contrast, when the positioning charge information does not indicate that the information providing apparatus determines the position location, the terminal device receives an information providing service of the so-called "Based type." According to a protocol in this case, the terminal device is required, for example, to catch the positional information satellites and to generate the positioning basis information on the basis of the aid information from the information providing apparatus. Further, the terminal device is required to determine the position location and to output the terminal-located position information.

In this respect, according to the construction of the first invention, the terminal device can judge the type of the information providing apparatus on the basis of the positioning charge information contained in the aid information by the information-providing-apparatus-sort judgment device. Further, the information providing apparatus can acquire the terminal-located position information through the location of the current position by the terminal-located-result-information generation device.

However, whether or not the terminal-located position information is to be outputted is determined on the basis of the judged result of the information-providing-apparatus-sort judgment device. More specifically, when the positioning charge information indicates that the information providing apparatus determines the position location, the terminal device judges the sort of the information providing apparatus as being the sort that performs the service of the assisted type. Herein, the terminal device outputs the information-providing-apparatus-located position information that the information providing apparatus has generated through the position location thereof.

Therefore, the terminal device can conform to the information providing apparatus of the sort that performs the service of the assisted type.

On the other hand, when the positioning charge information indicates that the information providing apparatus does not perform the position location, the terminal device judges the sort of the information providing apparatus as being the sort that performs the service of the based type. Herein, the terminal device determines the location of the current position and outputs the terminal-located position information thus generated. Therefore, the terminal device can also conform to the typed information providing apparatus that performs a based type service.

Owing to the above, the terminal device can output the located position information items in conformity with the sorts of the information providing apparatuses.

Further, the terminal device alters its control in accordance with the types of information providing apparatuses, as stated above, so that the cost of the terminal device can be made lower than in a case where the terminal device has constructions respectively conforming to the plurality of information providing apparatuses.

Thus, the position locating system that can utilize the aid information from the plurality of sorts of external apparatuses can be provided without raising the cost. Further, the terminal device generates the signal reception time information by the terminal-located-result-information generation device, and it corrects the positioning basis information and generates the corrected positioning basis information on the basis of the signal reception time information by the positioning-basis-information correction device.

Moreover, the terminal device transmits the corrected positioning basis information to the information providing apparatus on the basis of the judged result of the information-providing-apparatus-sort judgment device by the corrected-positioning-basis-information transmission device.

In a case, for example, where the terminal device transmits the positioning basis information, for example, pseudo range information to the information providing apparatus, it transmits this information together with the precise reception time information items of the position-relevant signals which form the bases of the generation of the pseudo range. Here, for the position location based on the position-relevant signals from the positional information satellites, the precise reception time information items of the position-relevant signals are information items that are necessary for heightening the precision of the position location. In this respect, since the terminal device transmits the corrected positioning basis information to the information providing apparatus, the information providing apparatus can perform the precise position location even when this information providing apparatus itself cannot generate the precise time information.

Further, the terminal device can output the precise located position information that the information providing apparatus has generated on the basis of the corrected positioning basis information.

According to a second aspect of the present invention, the aforementioned object can be realized by a terminal device that is communicable with a plurality of various information providing apparatuses that provide aid information containing positioning charge information indicative of whether or not the corresponding information providing apparatus determines position location based on position-relevant signals from positional information satellites. The terminal device includes aid-information acquisition device, an information-providing-apparatus-sort judgment device, a position-relevant-signal reception device, a terminal-located-result-information generation device, a positioning-basis-information correction device, a corrected-positioning-basis-information transmission device, an information-providing-apparatus-located-position-information acquisition device, and a located-position-information output device. The including aid-information acquisition device acquires the aid information from the information providing apparatus. The information-providing-apparatus-sort judgment device judges the sort of information providing apparatus on the basis of the positioning charge information contained in the aid information. The position-relevant-signal reception device receives the position-relevant signals on the basis of the aid information. The positioning-basis-information generation device generates positioning basis information on the basis of the position-relevant signals. The terminal-located-result-information generation device locates a current position on the basis of the positioning basis information to generate terminal-located position information and signal reception time information that indicate signal reception times of the position-relevant signals. The positioning-basis-information correction device corrects the positioning basis information on the basis of the signal reception time information to generate corrected positioning basis information. The corrected-positioning-basis-information transmission device transmits the corrected positioning basis information to the information providing apparatus on the basis of a judged result of the information-providing-apparatus-sort judgment device. The information-providing-apparatus-located-position-information acquisition device acquires information-providing-apparatus-located position information that indicates a position location result based on the corrected positioning basis information as has been performed by the information providing apparatus. The located-position-information output device outputs the terminal-located position information or the information-providing-apparatus-located position information on the basis of a judged result of the information-providing-apparatus-sort judgment device.

According to the construction of the terminal device of the second aspect, as in the construction of the device of the first invention, the aid information items from the plurality of various external apparatuses can be utilized without raising the cost.

A terminal device according to a third aspect of the present invention is the device of the second aspect, wherein the corrected-positioning-basis-information transmission device transmits the corrected positioning basis information to the information providing apparatus when the positioning charge information indicates that the information providing apparatus determines the position location.

According to the construction of the device of the third aspect of the present invention, the corrected-positioning-basis-information transmission device transmits the corrected positioning basis information to the information providing apparatus when the positioning performance information indicates that the information providing apparatus performs the position location. Therefore, the terminal device can conform to the information providing apparatus of the sort which performs the assisted type service.

Further, in a case in which the information providing apparatus does not determine the position location, the terminal device itself may determine the position location and output the located position result thus acquired. Hence, it does not transmit the corrected positioning basis information to the information providing apparatus.

Therefore, the terminal device can also conform to the type of information providing apparatus that performs the based type service.

A terminal device according to a fourth aspect of the present invention has the construction of the device of either the second or third aspect; wherein the positioning-basis-information correction device corrects only the positioning basis information used for the generation of the terminal-located position information by the located-result acquisition device.

The positioning basis information items are generated in correspondence with the respective positional information satellites, but the generated positioning basis information items cannot always be used for the position location. In a case, for example, in which the signal intensity of the position-relevant signal on which the positioning basis information is based is insufficient, it is inappropriate to use the positioning basis information for the position location. Herein, when the positioning basis information unsuitable for the position location is subjected to the above correction to transmit the corrected positioning basis information, the information providing apparatus sometimes fails to locate the position by using the corrected positioning basis information even if it has acquired this corrected positioning basis information.

In this respect, according to the construction of the device of the fourth aspect, the positioning-basis-information correction device corrects only the positioning basis information used for the generation of the terminal-located position information by the located-result acquisition device, so that the corrected positioning basis information that can be reliably used for the position location can be transmitted to the information providing apparatus.

A terminal device according to a fifth aspect of the present invention has the construction of the device of any one of the second to fourth aspects wherein the located-position-information transmission device transmits the terminal-located position information to the information providing apparatus when the positioning charge information indicates that the information providing apparatus does not perform the position location.

In a case, for example, in which the information providing apparatus that performs the based type service makes a request for the terminal-located position information generated by the terminal device, this terminal device can comply with the request of the information providing apparatus.

The information providing apparatus that has acquired the located result information can use the located position information as basis information in the case of the next provision of the aid information to the terminal device, and can also provide the located position information to the third party.

A method for a terminal device according to a sixth aspect of the present invention realizes the aforementioned object by a control method. The control method includes: an assist-information acquisition step allowing the terminal device, which is communicable with a plurality of various information providing apparatuses that provide aid information containing positioning charge information indicative of whether or not the corresponding information providing apparatus determines or indicates position location based on position-relevant signals from positional information satellites, to acquire the aid information from the information providing apparatuses; an information-providing-apparatus-sort judgment step allowing the terminal device to judge the sort of information providing apparatus on the basis of the positioning charge information contained in the aid information; a position-relevant-signal reception step allowing the terminal device to receive the position-relevant signals on the basis of the aid information; a positioning-basis-information generation step allowing the terminal device to generate positioning basis information on the basis of the position-relevant signals; a terminal-located-result-information generation step allowing the terminal device to locate a current position on the basis of the positioning basis information to generate terminal-located position information and signal reception time information that indicate signal reception times of the position-relevant signals; a positioning-basis-information correction step allowing the terminal device to correct the positioning basis information on the basis of the signal reception time information to generate corrected positioning basis information; a corrected-positioning-basis-information transmission step allowing the terminal device to transmit the corrected positioning basis information to the information providing apparatus on the basis of a judged result at the information-providing-apparatus-sort judgment step; an information-providing-apparatus-located-position-information acquisition step allowing the terminal device to acquire information-providing-apparatus-located position information that is a result of the position location based on the corrected positioning basis information as has been performed by the information providing apparatus; and a located-position-information output step allowing the terminal device to output the terminal-located position information or the information-providing-apparatus-located position information on the basis of a judged result at the information-providing-apparatus-sort judgment step.

According to the control method of the sixth aspect, as in the construction of the device of the first aspect, the aid information items from the plurality of external assist type apparatuses used therein can be utilized without raising the cost. Further, as in the construction of the terminal device the first aspect, the terminal device used in the method of the sixth aspect corrects the positioning basis information and generates the corrected positioning basis information on the basis of the signal reception time information by the positioning-basis-information correction device to transmit the generated information to the information providing apparatus so that the information providing apparatus can determine the precise position location even when this information providing apparatus itself cannot generate the precise time information.

A program for a terminal device according to a seventh aspect of the invention can realize the aforementioned object by a control program. The control program causes a computer to execute: an assist-information acquisition step allowing the terminal device, which is communicable with a plurality of various information providing apparatuses that provide aid information containing positioning charge information indicative of whether or not the corresponding information providing apparatus indicates position location based on position-relevant signals from positional information satellites, to acquire the aid information from the information providing apparatuses; an information-providing-apparatus-sort judgment step allowing the terminal device to judge the sort of information providing apparatus on the basis of the positioning charge information contained in the aid information; a position-relevant-signal reception step allowing the terminal device to receive the position-relevant signals on the basis of the aid information; a positioning-basis-information generation step allowing the terminal device to generate positioning basis information on the basis of the position-relevant signals; a terminal-located-result-information generation step allowing the terminal device to locate a current position on the basis of the positioning basis information to generate terminal-located position information and signal reception time information that indicate signal reception times of the position-relevant signals; a positioning-basis-information correction step allowing the terminal device to correct the positioning basis information on the basis of the signal reception time information to generate corrected positioning basis information; a corrected-positioning-basis-information transmission step allowing the terminal device to transmit the corrected positioning basis information to the information providing apparatus on the basis of a judged result at the information-providing-apparatus-sort judgment step; an information-providing-apparatus-located-position-information acquisition step allowing the terminal device to acquire information-providing-apparatus-located position information that is a result of the position location based on the corrected positioning basis information as has been performed by the information providing apparatus; and a located-position-information output step allowing the terminal device to output the terminal-located position information or the information-providing-apparatus-located position information on the basis of a judged result at the information-providing-apparatus-sort judgment step.

According to an eighth aspect of the present invention, the aforementioned object is realized by a computer-readable record medium that stores therein a control program for a terminal device. The control program causes a computer to execute: an assist-information acquisition step allowing the terminal device, which is communicable with a plurality of various information providing apparatuses that provide aid information containing positioning charge information indicative of whether or not the corresponding information providing apparatus performs position location based on position-relevant signals from positional information satellites to acquire the aid information from the information providing apparatuses; an information-providing-apparatus-sort judgment step allowing the terminal device to judge the sort of information providing apparatus on the basis of the positioning charge information contained in the aid information; a position-relevant-signal reception step allowing the terminal device to receive the position-relevant signals on the basis of the aid information; a positioning-basis-information generation step allowing the terminal device to generate positioning basis information on the basis of the position-relevant signals; a terminal-located-result-information generation step allowing the terminal device to locate a current position on the basis of the positioning basis information to generate terminal-located position information and signal reception time information that indicate signal reception times of the position-relevant signals; a positioning-basis-information correction step allowing the terminal device to correct the positioning basis information on the basis of the signal reception time information to generate corrected positioning basis information; a corrected-positioning-basis-information transmission step allowing the terminal device to transmit the corrected positioning basis information to the information providing apparatus on the basis of a judged result at the information-providing-apparatus-sort judgment step; an information-providing-apparatus-located-position-information acquisition step allowing the terminal device to acquire information-providing-apparatus-located position information that is a result of the position location based on the corrected positioning basis information as has been performed by the information providing apparatus; and a located-position-information output step allowing the terminal device to output the terminal-located position information or the information-providing-apparatus-located position information on the basis of a judged result at the information-providing-apparatus-sort judgment step.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will apparent to those skilled in the art from this disclosure that the following descriptions of the embodiments of the present invention are provided for illustration only and not for the purpose of limiting the invention as defined by the appended claims and their equivalents.

Figure 1:
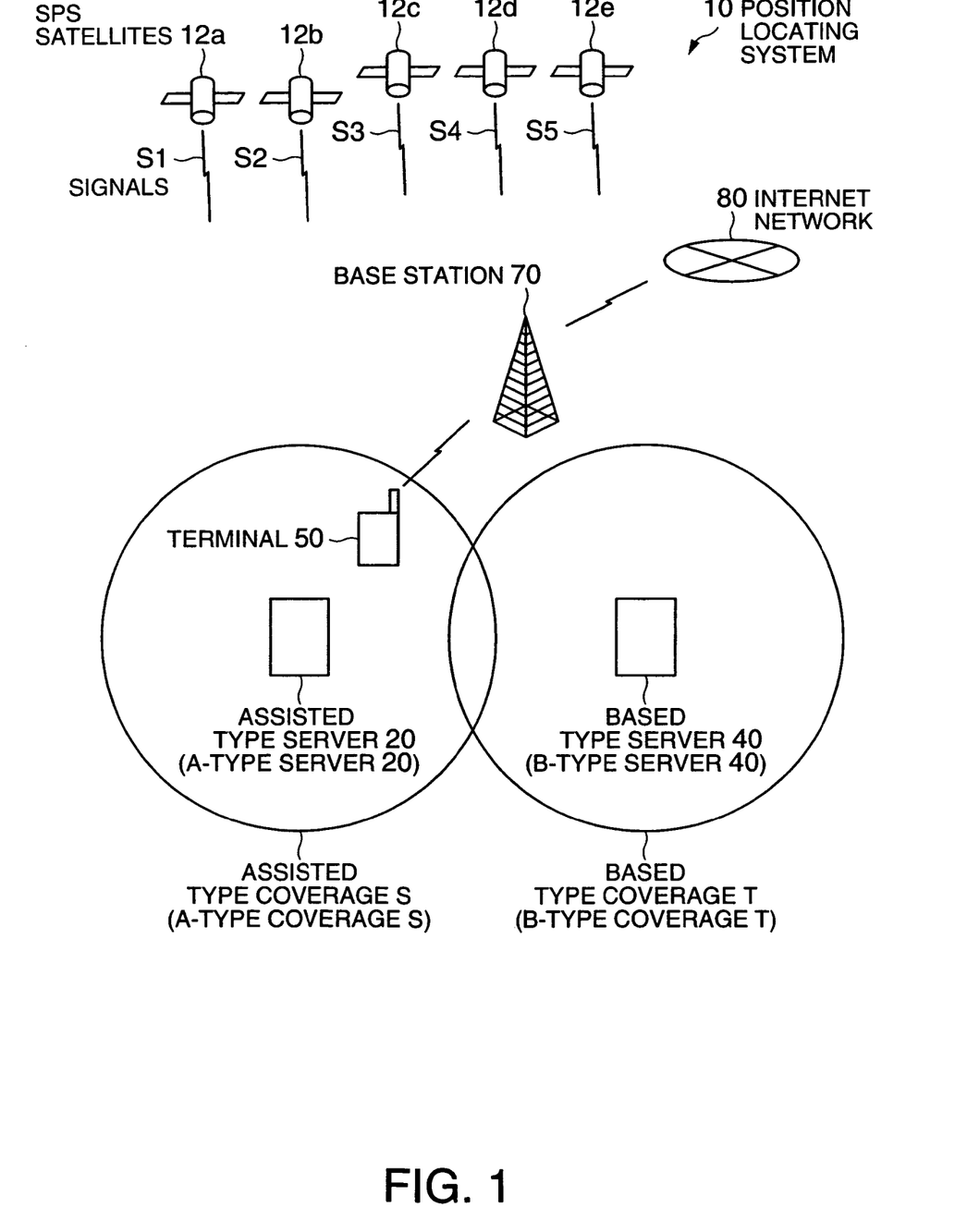
FIG. 1 is a schematic view showing a position locating system according to a first preferred embodiment of the present invention.

FIG. 1 is a schematic view showing a position locating system 10 according to a first preferred embodiment of the present invention. As shown in FIG. 1, the position locating system 10 includes a terminal device, for example, a terminal 50, which acquires the located result of a current position based on position-relevant signals, for example, signals S1 through S5, from positional information satellites, for example, SPS satellites 12a, 12b, 12c, 12d, and 12e. The terminal 50 is any of, for example, a portable telephone, a PHS (Personal Handy-phone System), and a PDA (Personal Digital Assistant) which, however, are not restrictive. Incidentally, the number of the SPS satellites 12a to 12e is not restricted to five as in this embodiment, but it may well be at most six or at least four.

The position locating system 10 also includes a plurality of various information providing apparatuses, for example, an assisted type server 20 (hereinafter, termed "A-type server 20") and a based type server 40 (hereinafter, termed "B-type server 40"), which provide aid information, for example, assist data to the terminal 50. The terminal 50 has a construction so that it is communicable with the A-type server 20 or the B-type server 40 through a base station 70 mediating communications, and a communication network, for example, an Internet network 80. Hereinafter, the information providing apparatus which includes the A-type server 20 or the B-type server 40 providing the assist data of the terminal 50 shall be simply termed "server." Incidentally, at least one A-type server 20 exists, and at least one B-type server 40 also exists.

Although both the A-type server 20 and the B-type server 40 are the apparatuses that provide the assist data for position location to the terminal 50, they differ in the contents of the assist data and the requirements of operating methods for the terminal 50. The terminal 50 can receive the assist data from only the A-type server 20 in an assisted type coverage S (hereinafter, termed "A-type coverage S"), which is the service area of the A-type server 20, while it can receive the assist data from only the B-type server 40 in a based type coverage T (hereinafter, termed "B-type coverage T"), which is the service area of the B-type server 40. By the way, in the overlap area between the A-type coverage S and the B-type coverage T, the terminal 50 can receive only the assist data of, for example, higher signal intensity.

In the A-type coverage S of the A-type server 20 being an assisted type server, the terminal 50 is required to "catch" the signals from the SPS satellites 12a to 12e and to compute a pseudo range on the basis of the signals S1 to S5 thereof, on the basis of the assist data from the A-type server 20, and to transmit information indicative of the pseudo range to the A-type server 20. Further, the terminal 50 is required to output located position information generated by the position location of the A-type server 20. The assist data from the A-type server 20 contain the minimum required information to catch the signals of the individual SPS satellites 12a to 12e, for example, information indicating the Doppler effects of the signals from the respective SPS satellites 12a to 12e, and the elevation angles of the respective SPS satellites 12a to 12e.

Incidentally, apart from the aspect where the A-type server 20 itself having provided the assist data locates the position and generates the located position information, an A-type server 20 separate from the A-type server 20 having provided the assist data locates the position and generates located position information in some cases.

In contrast, in the B-type coverage T of the B-type server 40, which is a based type server, the terminal 50 is required to catch the signals of the SPS satellites 12a to 12e and compute a pseudo range on the basis of the signals of these satellites and on the basis of the assist data from the B-type server 40, and to locate the position on the basis of the pseudo range and output located position information. The assist data from the B-type server 40 contain navigation data containing, for example, the satellite orbit information of the individual SPS satellites 12a to 12e, in addition to the contents of the assist data from the A-type server.

The terminal 50 can receive the assist data in both the assisted type coverage S and the based type coverage T of which the different protocols are required as stated above, owing to the following hardware architecture and software architecture.

(Principal hardware architecture of Terminal 50)

Figure 2:
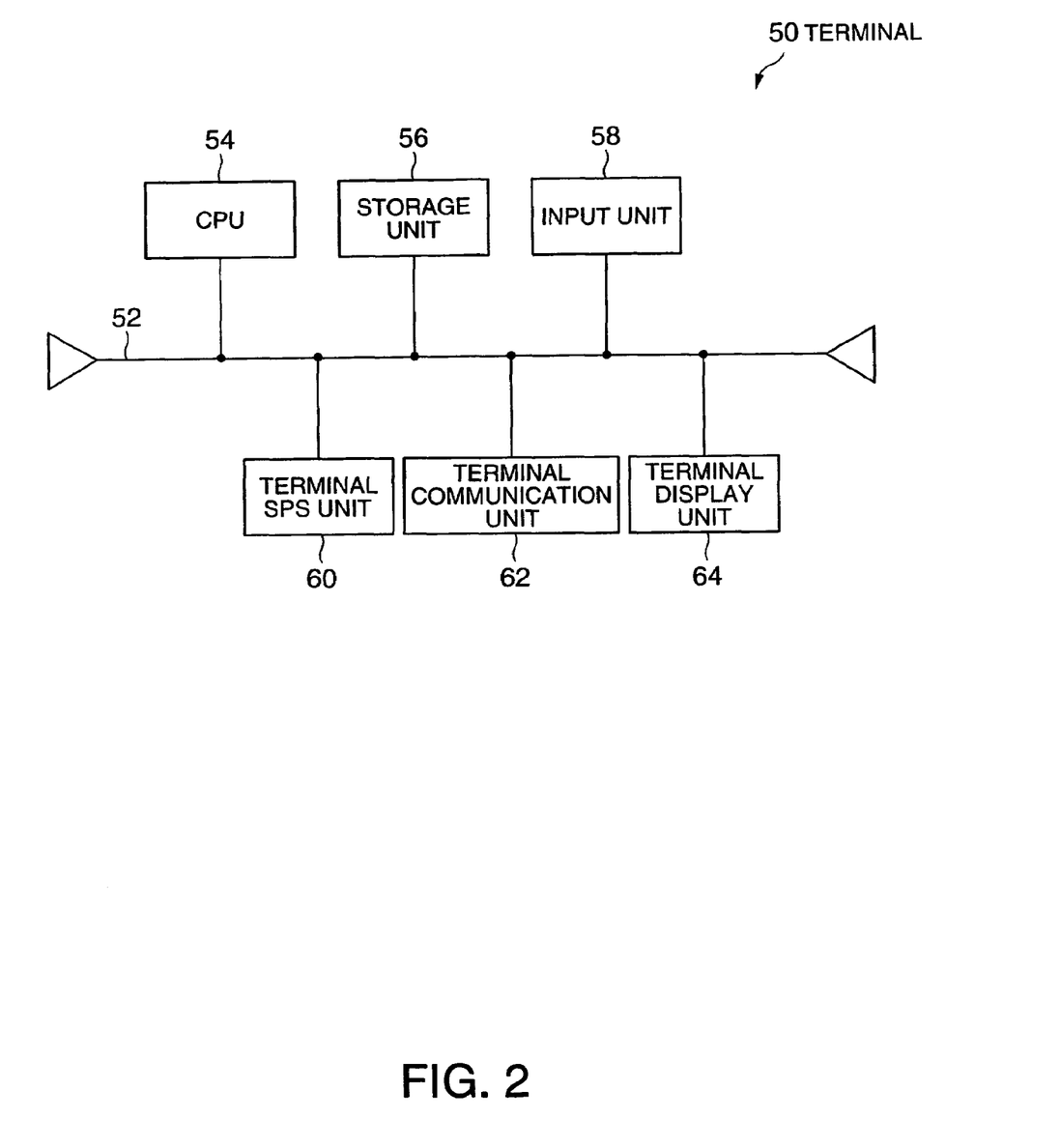
FIG. 2 is a view of a schematic diagram showing the principal hardware architecture of a terminal of the position locating system.

FIG. 2 is a view of a schematic diagram showing the principal hardware architecture of the terminal 50. As shown in FIG. 2, the terminal 50 includes a computer, which has a bus 52. A CPU (Central Processing Unit) 54, a storage unit 56, etc. are connected to the bus 52. The storage unit 56 is any of, for example, a RAM (Random Access Memory), a ROM (Read Only Memory), etc. Also connected to the bus 52 are an input unit 58 to input various items of information, a terminal SPS unit 60 to receive the signals from the SPS satellites 12a to 12e, a terminal communication unit 62 to communicate with the A-type server 20, etc., and a terminal display unit 64 to display various information items.

(Principal software architecture of Terminal 50)

Figure 3:
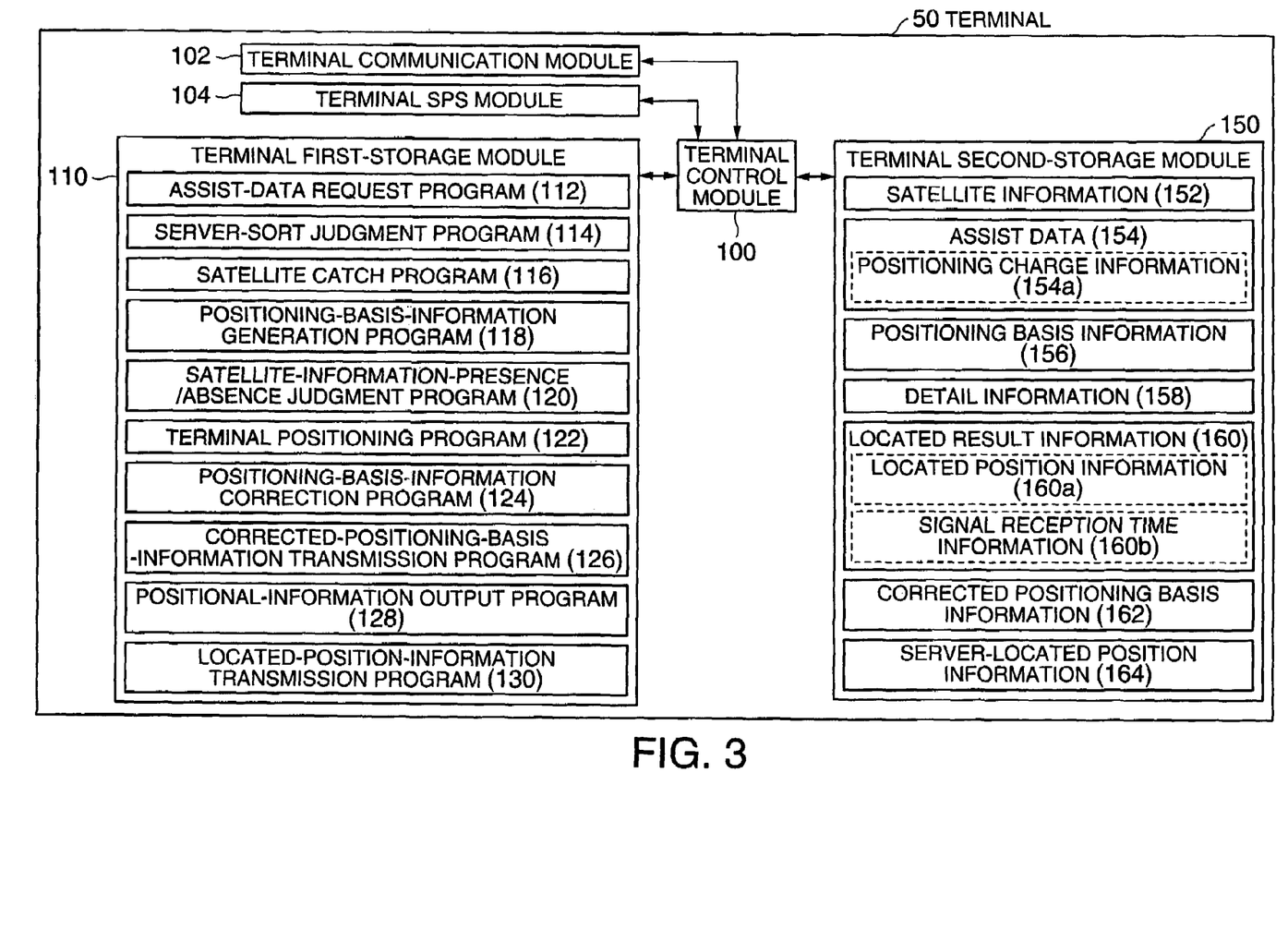
FIG. 3 is a view of a schematic diagram showing the principal software architecture of the terminal.

FIG. 3 is a view of a schematic diagram showing the principal software architecture of the terminal 50. As shown in FIG. 3, the terminal 50 includes a terminal control module 100 to control individual modules, a terminal communication module 102 corresponding to the terminal communication unit 62 in FIG. 2, and a terminal SPS module 104 corresponding to the terminal SPS unit 60 in FIG. 2.

Further, as shown in FIG. 3, the terminal 50 includes a terminal first-storage module 110, which stores various programs therein, and a terminal second-storage module 150, which stores various information items therein. The terminal 50 keeps an assist-data request program 112 stored in the terminal first-storage module 110. The assist-data request program 112 has information with which the terminal control module 100 requests the server to transmit the assist data. In other words, the assist-data request program 112 and the terminal control module 100 constitute an example of an aid information acquisition device.

The terminal control module 100 stores the acquired assist data as assist data 154 in the terminal second-storage module 150. The assist data 154 contain, in addition to the above mentioned contents, positioning charge information 154a that indicates whether or not the server determines the position location. The positioning charge information 154a is an example of positioning charge information.

As shown in FIG. 3, the terminal 50 keeps a server-sort judgment program 114 stored in the terminal first-storage module 110. The server-sort judgment program 114 has information with which the terminal control module 100 judges the sort of server on the basis of the positioning charge information 154a. In other words, the server-sort judgment program 114 and the terminal control module 100 constitute an example of an information-providing-apparatus sort judgment device.

Concretely, the positioning charge information contained in the assist data from the A-type server 20 indicates that the A-type server 20 determines the position location. The terminal control module 100 therefore judges that the server sort is the type that performs the assisted type service. Further, as will be explained later, the terminal control module outputs the located position information generated by the position location of the A-type server 20. Consequently, the terminal 50 can conform to the A-type server 20 that performs the assisted type service.

On the other hand, the positioning charge information 154a contained in the assist data from the B-type server 40 indicates that the B-type server 40 does not determine the position location. The terminal control module 100 therefore judges that the server sort is the type that performs the based type service. Further, as will be explained later, the terminal control module outputs the located position information generated by the position location of the current position of the terminal 50. Consequently, the terminal 50 can conform also to the B-type server 40, which performs the based type service.

Incidentally, apart from the aspect of this embodiment, the terminal 50 may well be constructed to judge the types of A-type server 20 and B-type server 40 in accordance with the contents of the assist data. The reason therefor is that, since the contents of the assist data to be transmitted by the assisted type server and the assist data to be transmitted by the based type server are different as stated, the types of servers can be judged from the differences in the contents of the assist data. In this case, the assist data themselves are used as the positioning charge information.

As shown in FIG. 3, the terminal 50 keeps a satellite catch program 116 stored in the terminal first-storage module 110. The satellite catch program 116 has information with which the terminal control module 100 receives the signals S1 to S5 from the SPS satellites 12a to 12e on the basis of the assist data 154. In other words, the satellite catch program 116 and the terminal control module 100 constitute an example of a position-relevant signal reception device.

As shown in FIG. 3, the terminal 50 keeps a positioning-basis-information generation program 118 stored in the terminal first-storage module 110. The positioning-basis-information generation program 118 has information with which the terminal control module 100 generates positioning basis information on the basis of the signals S1 to S5. The positioning basis information contains, for example, information that indicates the pseudo range between the terminal 50 and the individual SPS satellites 12a to 12e, information that indicates the Doppler effects of the individual signals S1 to S5, and signal reception time information that indicates the times of the receptions of the signals S1 to S5. The positioning basis information 156 is the set (or combination) of positioning basis information items generated for the respective SPS satellites 12a to 12e.

The positioning basis information 156 having the above contents is information that has contents forming the bases of positioning computations. In other words, the positioning basis information 156 is an example of positioning basis information. Besides, the positioning-basis-information generation program 118 and the terminal control module 100 constitute an example of a positioning-basis-information generation device. The terminal control module 100 stores the generated positioning basis information 156 in the terminal second-storage module 150. Further, the terminal control module 100 generates detail information 158 together with the positioning basis information 156, and it stores the generated detail information in the terminal second-storage module 150. The detail information 158 is information that indicates, for example, the signal intensity of the signal S1. This detail information 158 can be used, for example, to determine whether or not the signal S1 is to be used for the position location.

As shown in FIG. 3, the terminal 50 keeps a satellite-information-presence/absence judgment program 120 stored in the terminal first-storage module 110. The satellite-information-presence/absence judgment program 120 has information with which the terminal control module 100 judges whether or not satellite information 152 is stored in the terminal second-storage module 150. If the satellite information 152 is stored in the terminal second-storage module 150 as shown in FIG. 3, the terminal 50 can perform the positioning computation of the current position on the basis of the positioning basis information 156 as will be explained later, without acquiring anew satellite information from outside.

As shown in FIG. 3, the terminal 50 keeps a terminal positioning program 122 stored in the terminal first-storage module 110. The terminal positioning program 122 is information with which the terminal control module 100 locates the current position and generates located result information 160 on the basis of the positioning basis information 156. The located result information 160 contains located position information 160a and signal reception time information 160b.

The located position information 160a, which indicates the position of the terminal 50 in three dimensions, and the signal reception time information 160b, which indicates the times of the receptions of the signal S1 to S5 can be generated by the position location which uses, for example, at least four SPS satellites 12a to 12e. The located position information 160a is an example of terminal-located position information, and the signal reception time information 160b is an example of signal reception time information. Further, the terminal positioning program 122 and the terminal control module 100 constitute an example of the terminal-located-result-information generation device.

As shown in FIG. 3, the terminal 50 keeps a positioning-basis-information correction program 124 stored in the terminal first-storage module 110. The positioning-basis-information correction program 124 is information with which the terminal control module 100 corrects the positioning basis information items of each SPS satellite 12a to 12e as contained in the positioning basis information 156, and generates corrected positioning basis information 162 on the basis of the signal reception time information 160b. That is, the positioning-basis-information correction program 124 and the terminal control module 100 constitute an example of a positioning-basis-information correction device. The corrected positioning basis information 162 is the set (or combination) of information items of corrected measurements generated by correcting the respective positioning basis information items of each SPS satellite 12a to 12e.

Concretely, the terminal control module 100 corrects only the positioning basis information used for the generation of the located position information 160a by affixing the signal reception time information 160b on the basis of the positioning-basis-information correction program 124.

The positioning basis information items are generated in correspondence with the individual SPS satellites 12a to 12e. However, in such a case where the signal intensities of the signals S1 to S5 on which the positioning basis information items are based are insufficient, the generated positioning basis information cannot be used for the position location. Herein, when the corrected positioning basis information 162 is transmitted as will be explained later, on the basis of the positioning basis information that is unusable for the position location, the A-type server 20 might possibly fail to locate the position by using the corrected positioning basis information 162 in spite of having acquired this corrected positioning basis information 162. Therefore, the terminal control module 100 generates the corrected positioning basis information 162 by correcting only the positioning basis information that was used for the generation of the located position information 160a and that has been verified to be usable for the position location. The terminal control module 100 stores the corrected positioning basis information 162 generated in the above way in the terminal second-storage module 150.

As shown in FIG. 3, the terminal 50 keeps a corrected-positioning-basis-information transmission program 126 stored in the terminal first-storage module 110. The corrected-positioning-basis-information transmission program 126 has information with which the terminal control module 100 transmits the corrected positioning basis information 162 to the A-type server 20 on the basis of the judged result of the server-sort judgment program 114. In other words, the corrected-positioning-basis-information transmission program 126 and the terminal control module 100 constitute an example of a corrected-positioning-basis-information transmission device.

Concretely, the terminal control module 100 transmits the corrected positioning basis information 162 when it has been judged from the judged result of the server-sort judgment program 114 that the A-type server 20 is the assisted type server.

On this occasion, the corrected positioning basis information 162 suffices with the set (or combination) which is made of the corrected positioning basis information items of three of the SPS satellites 12a to 12e. Since the individual positioning basis information items bear the signal reception time information items 160b, SPS times are known. It is accordingly unnecessary to calculate the SPS times by the positioning computations. Therefore, even in the case of performing the three-dimensional positioning, the four SPS satellites 12a to 12e are not necessary, but three of them are sufficient. Thus, the quantity of information that the terminal 50 transmits to the A-type server 20 may be small, and the positioning computations of the A-type server 20 become quick.

Here, for the position location based on the signals S1 to S5 from the SPS satellites 12a to 12e (refer to FIG. 1), the precise reception time information items of the signals S1 to S5 are information items that are necessary to heighten the precision of the position location. In this respect, the terminal 50 transmits the corrected positioning basis information 162 to the A-type server 20 so that the A-type server 20 can precisely locate the position even in a case in which this A-type server 20 itself cannot generate the precise time information. Further, as will be explained later, the terminal 50 can output the precise located position that the A-type server 20 has generated on the basis of the corrected positioning basis information 162.

More specifically, the terminal 50 receives through the terminal communication module 102 server-located position information 164 that is the result of the position location performed on the basis of the corrected positioning basis information 162 by the A-type server 20. The server-located position information 164 is an example of information-providing-apparatus location position information, and the terminal communication module 102 is an example of an information-providing-apparatus location-position-information acquisition device. The server-located position information 164 acquired by the terminal communication module 102 is stored in the terminal second-storage module 150 by the terminal control module 100.

As shown in FIG. 3, the terminal 50 keeps a positional-information output program 128 stored in the terminal first-storage module 110. The positional-information output program 128 has information with which the terminal control module 100 outputs the located position information 160a generated by the terminal 50 itself, or the server-located position information 164, on the basis of the judged result of the server-sort judgment program 114. In other words, the positional-information output program 128 and the terminal control module 100 constitute an example of a located-position-information output device.

Concretely, in a case where the terminal control module 100 has judged that the server having transmitted the assist data is the A-type server 20 being of the assisted type, this module, for example, displays the server-located position information 164 on the terminal display unit 64 shown in FIG. 2.

In contrast, in a case in which the terminal control module 100 has judged that the server having transmitted the assist data is the B-type server 40 being of the based type, this module displays, for example, the located position information 160a generated by the terminal 50 itself on the terminal display unit 64 in FIG. 2. In this manner, the terminal 50 can conform to both the A-type server 20, which performs the assisted type service, and the B-type server 40, which performs the based type service.

As shown in FIG. 3, the terminal 50 keeps a located-position-information transmission program 130 stored in the terminal first-storage module 110. The located-position-information transmission program 130 is information with which the terminal control module 100 transmits the located position information 160a generated by the terminal 50 itself, to the B-type server 40 when the positioning charge information 154a indicates that the B-type server 40 does not perform the position location. In other words, the located-position-information transmission program 130 and the terminal control module 100 constitute an example of a located-position-information transmission device.

In a case, for example, where the B-type server 40 which performs the based type service makes a request for the located position information 160a generated by the terminal 50, this terminal 50 can comply with the request of the B-type server 40. The B-type server 40 having acquired the located position information 160a can use this located position information 160a as basis information in the case of providing the next assist data set received by the terminal 50, and it can also provide this located position information 160a to a third party.

The above is the construction of the position locating system 10 according to this embodiment, and an operating example thereof will be described below by referring chiefly to FIG. 4.

Figure 4:
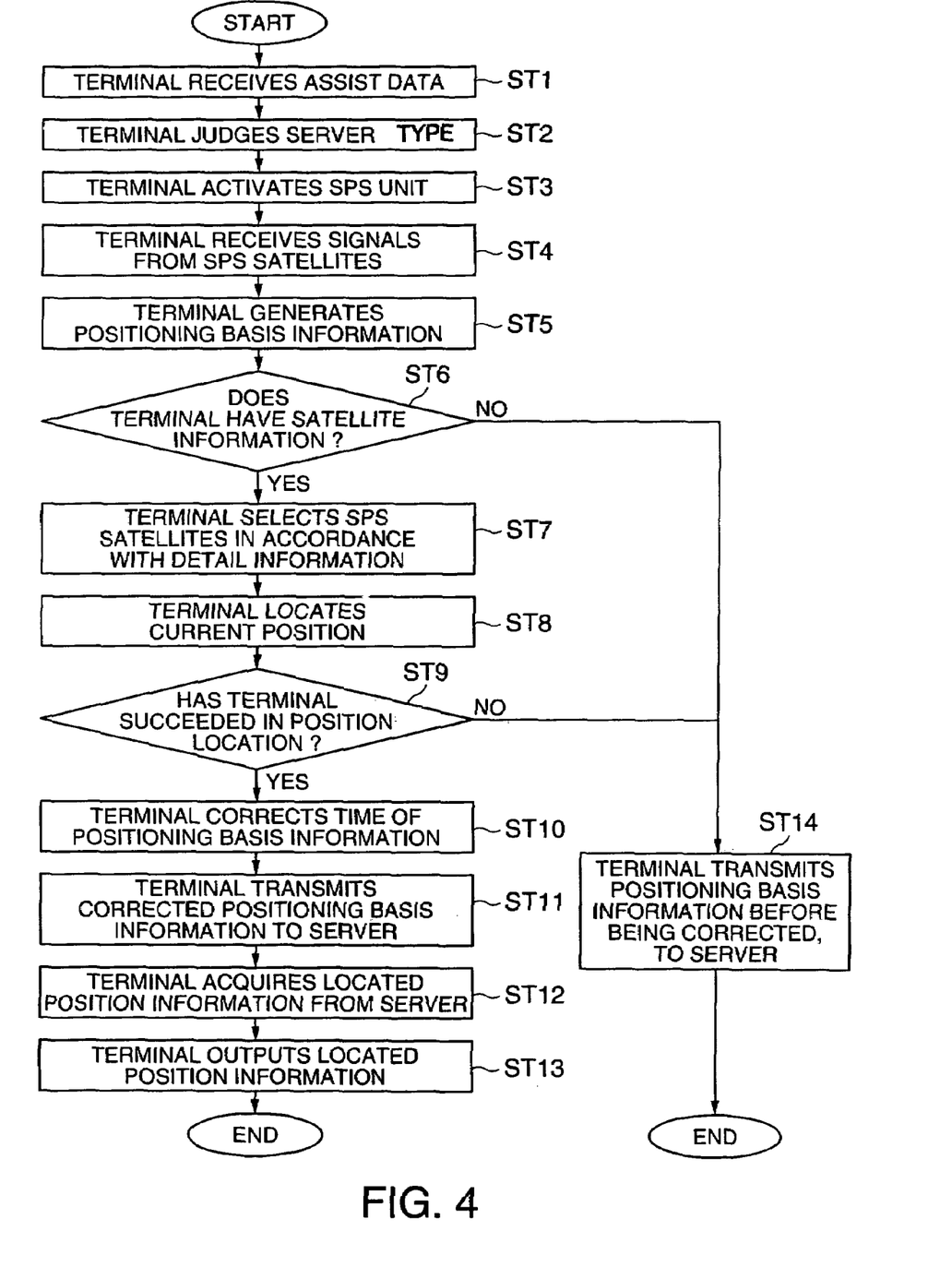
FIG. 4 is a view of a schematic flow chart showing an operating example of the position locating system.

FIG. 4 is a view of a schematic flow chart showing an operating example of the position locating system 10 according to this embodiment. The ensuing description will be made premising that, as shown in FIG. 1, the terminal 50 lies in the A-type coverage S.

First, the terminal 50 receives the assist data 154 (refer to FIG. 3) from the A-type server 20 (step ST1). The step ST1 is an example of an aid-information acquisition step.

Subsequently, the terminal 50 judges the type of server on the basis of the acquired assist data 154 (step ST2). The step ST2 is an example of an information-providing-apparatus-sort judgment step. Concretely, the terminal 50 judges the type of server to be an assisted type on the basis of the positioning charge information 154*a* contained in the assist data 154.

Subsequently, the terminal 50 activates the terminal SPS unit 60 (refer to FIG. 2) (step ST3) to receive the signals S1 to S5 from the SPS satellites 12*a* to 12*e* (refer to FIG. 1) (step ST4). The step ST4 is an example of a position-relevant-signal reception step.

Subsequently, the terminal 50 generates the positioning basis information 156 (refer to FIG. 3) (step ST5). The step ST5 is an example of a positioning-basis-information generation step.

Subsequently, the terminal 50 judges if it has the satellite information 152 (refer to FIG. 3) (step ST6). Subject to the judgment that the terminal has the satellite information 152, the terminal selects the SPS satellites 12*a* to 12*e* in accordance with the detail information 158 (refer to FIG. 3) (step ST7). Concretely, any satellite having a narrow elevation angle or any satellite having low signal intensity is excluded. Thus, only the signals S1 to S5 from the SPS satellites 12*a* to 12*e* having wide elevation angles and high signal intensities can be used so that the precision of the position location is enhanced.

Subsequently, the terminal 50 locates the current position on the basis of the positioning basis information 156 and the satellite information 152 (step ST8). The step ST8 is an example of a terminal-located-result-information generation step. The located result information 160 (refer to FIG. 3) generated at the step ST8 contains the located position information 160*a* and the signal reception time information 160*b*.

Subsequently, the terminal 50 judges whether or not it has succeeded in the position location (step ST9). Subject to the judgment that the terminal has succeeded in the position location, the terminal corrects the positioning basis information 156 on the basis of the signal reception time information 160*b* (step ST10). Concretely, the terminal affixes the signal reception time information 160*b* to the positioning basis information 156, thereby to generate the corrected positioning basis information 162 (refer to FIG. 3). The step ST 10 is an example of a positioning-basis-information correction step.

Further, at the step ST 10, the positioning basis information that was not used to acquire the located result information 160 is removed. In other words, only the positioning basis information that has been verified to be usable for the position location is corrected.

Subsequently, the terminal 50 transmits the corrected positioning basis information 162 to the A-type server 20 (step ST11). The step ST11 is an example of a corrected-positioning-basis-information transmission step.

Subsequently, the terminal 50 acquires the server-located position information 164 (refer to FIG. 3) from the A-type server 20 (step ST12), and it outputs and displays the server-located position information 164 on the terminal display unit 64 (refer to FIG. 2) (step ST13). The step ST12 is an example of an information-providing-apparatus-located-result-information acquisition step, and the step ST13 is an example of a located-position-information output step.

Incidentally, the terminal 50 transmits the positioning basis information 156 to the A-type server 20 without correcting this information (step ST14) when it has been judged at the step ST6 that the terminal does not have the satellite information 152 (refer to FIG. 3) or when it has been judged at the step ST9 that the terminal has not succeeded in the position location.

The A-type server 20 can locate the position by using the positioning basis information 156, even though this information is inferior in the positioning precision to the corrected positioning basis information 162.

As thus far described, the terminal 50 can judge the sort of server and acquire the located position information in accordance with the sort.

(Regarding Programs and Computer-Readable Record Media)

Control programs for a terminal device can be formed to cause a computer to execute the aid-information acquisition step, the information-providing-apparatus-sort judgment step, the position-relevant-signal reception step, the positioning-basis-information generation step, the terminal-located-result-information generation step, the positioning-basis-information correction step, the corrected-positioning-basis-information transmission step, the information-providing-apparatus-located-position-information acquisition step, the located-position-information output step, etc. of the above operating example. Further, computer-readable record media storing such control programs for the terminal device therein can be fabricated.

The program storage medium that is used for installing such a control program for the terminal device in a computer into a state executable by the computer can be realized by any of, for example, a flexible disc such as Floppy (registered trademark), and package media such as a CD-ROM (Compact Disc Read Only Memory), CD-R (Compact Disc-Recordable), CD-RW (Compact Disc-Rewritable) and DVD (Digital Versatile Disc), but also by a semiconductor memory, a magnetic disc or magneto-optic disc in which the program is temporarily or persistently stored. However, the aforementioned are by no means exhaustive.

The invention is not restricted to the foregoing embodiments. Further, the invention may well be constructed by combining the foregoing embodiments with each other or one another.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A position locating system comprising:
   a terminal device being configured to acquire a located result of a current position based on position-relevant signals from positional information satellites; and
   a plurality of various information providing apparatuses being configured to provide aid information to said terminal device, said aid information including positioning charge information being configured to indicate whether or not an information providing apparatus of said plurality of various information providing apparatuses indicates a current position,
   said terminal device including,
      an aid-information acquisition device being configured to acquire said aid information from said information providing apparatus,
      an information-providing-apparatus-sort judgment device being configured to judge the type of said information providing apparatus on the basis of said positioning charge information contained in said aid information,
      a position-relevant-signal reception device being configured to receive the position-relevant signals on the basis of said aid information,
      a positioning-basis-information generation device being configured to generate positioning basis information on the basis of said position-relevant signals,
      a terminal-located-result-information generation device being configured to determine said current position on the basis of said positioning basis information to generate terminal-located position information and signal reception time information indicating signal reception times of said position-relevant signals,
      a positioning-basis-information correction device being configured to correct the positioning basis information on the basis of the signal reception time information to generate corrected positioning basis information,
      a corrected-positioning-basis-information transmission device being configured to transmit said corrected positioning basis information to said information providing apparatus on the basis of a judged result of said information-providing-apparatus-sort judgment device,
      a information-providing-apparatus-located-position-information acquisition device being configured to acquire information-providing-apparatus-located position information indicating a result of location based on said corrected positioning basis information indicated by said information providing apparatus, and
      a located-position-information output device being configured to output said terminal-located position information or said information-providing-apparatus-located position information on the basis of a judged result of said information-providing-apparatus-sort judgment device.

2. The position locating system according to claim 1, wherein
   said terminal device is configured to receive position-relevant signals from four to six positional information satellites at one time.

3. The position locating system according to claim 2, wherein
   said terminal device is configured to receive position-relevant signals from five positional information satellites at one time.

4. The position locating system according to claim 3, wherein
   said plurality of various information providing apparatuses includes an assisted type server and a based type server.

5. The position locating system according to claim 4, wherein,
   said terminal device is configured to communicate with said assisted type server or said based type server through a base station configured to mediate communications and a communication network.

6. The position locating system according to claim 1, wherein
   said plurality of various information providing apparatuses includes an assisted type server and a based type server.

7. The position locating system according to claim 2, wherein,
   said terminal device is configured to communicate with said assisted type server or said based type server through a base station configured to mediate communications and a communication network.

8. The position locating system according to claim 7, wherein
   said communication network is an Internet network.

9. The position locating system according to claim 1, wherein
   said terminal device includes,
      a bus,
      a CPU connected to said bus,
      a terminal SPS unit connected to said bus,
      a storage unit connected to said bus,
      a terminal communication unit connected to said bus,
      an input unit connected to said bus, and
      a terminal display unit connected to said bus.

10. A terminal device being configured to communicate with a plurality of various information providing apparatuses being configured to provide aid information containing positioning charge information indicative of whether or not a corresponding information providing apparatus determines position location based on position-relevant signals from positional information satellites, the terminal device comprising:
    an aid-information acquisition device being configured to acquire the aid information from one of the plurality of various information providing apparatuses;
    an information-providing-apparatus-sort judgment device being configured to judge the type of information providing apparatus on the basis of the positioning charge information contained in the aid information;
    a position-relevant-signal reception device being configured to receive the position-relevant signals on the basis of the aid information;
    a positioning-basis-information generation device being configured to generate positioning basis information on the basis of the position-relevant signals;
    a terminal-located-result-information generation device being configured to locate a current position on the basis of said positioning basis information to generate terminal-located position information and signal reception time information indicating signal reception times of the position-relevant signals;
a positioning-basis-information correction device being configured to correct said positioning basis information on the basis of said signal reception time information to generate corrected positioning basis information;
a corrected-positioning-basis-information transmission device being configured to transmit said corrected positioning basis information to said one of the plurality of various information providing apparatuses on the basis of a judged result of said information-providing-apparatus-sort judgment device;
an information-providing-apparatus-located-position-information acquisition device being configured to acquire information-providing-apparatus-located position information indicating a position location result based on said corrected positioning basis information provided by said one of the plurality of various information providing apparatuses; and
a located-position-information output device being configured to output said terminal-located position information or said information-providing-apparatus-located position information on the basis of a judged result of said information-providing-apparatus-sort judgment device.

11. A terminal device according to claim 10, wherein
said corrected-positioning-basis-information transmission device transmits said corrected positioning basis information to said information providing apparatus when said positioning charge information indicates that said information providing apparatus determines the position location.

12. A terminal device according to claim 11, wherein
said positioning-basis-information correction device corrects only said positioning basis information used for the generation of said terminal-located position information by said located-result acquisition device.

13. A terminal device according to claim 12, further comprising,
a located-position-information transmission device to transmit said terminal-located position information to said information providing apparatus when the positioning charge information indicates that said information providing apparatus does not determine the position location.

14. A terminal device according to claim 11, further comprising,
a located-position-information transmission device to transmit said terminal-located position information to said information providing apparatus when the positioning charge information indicates that said information providing apparatus does not determine the position location.

15. A terminal device according to claim 10, wherein
said positioning-basis-information correction device corrects only said positioning basis information used for the generation of said terminal-located position information by said located-result acquisition device.

16. A terminal device according to claim 15, further comprising,
a located-position-information transmission device to transmit said terminal-located position information to said information providing apparatus when the positioning charge information indicates that said information providing apparatus does not determine the position location.

17. A terminal device according to claim 10, further comprising,
a located-position-information transmission device to transmit said terminal-located position information to said information providing apparatus when the positioning charge information indicates that said information providing apparatus does not determine the position location.

18. A control method for a terminal device comprising:
acquiring aid information from a plurality of various information providing apparatuses by a terminal device being communicable with said plurality of various information providing apparatuses providing said aid information containing positioning charge information indicative of whether or not a corresponding information providing apparatus indicates position location based on position-relevant signals from positional information satellites;
judging the type of information providing apparatus from said corresponding information providing apparatus by said terminal device on the basis of said positioning charge information contained in said aid information;
receiving position-relevant signals by said terminal device on the basis of said aid information;
generating positioning basis information by said terminal device on the basis of said position-relevant signals;
locating a current position by said terminal device on the basis of said positioning basis information to generate terminal-located position information and signal reception time information indicating signal reception times of said position-relevant signals;
correcting said positioning basis information by said terminal device to correct said positioning basis information on the basis of said signal reception time information to generate corrected positioning basis information;
transmitting said corrected positioning basis information to said corresponding information providing apparatus by said terminal device on the basis of a judged result when judging the type of information providing apparatus;
acquiring information-providing-apparatus-located position information by said terminal device, said information-providing-apparatus-located position information being a result of the position location based on said corrected positioning basis information provided by said corresponding information providing apparatus; and
outputting said terminal-located position information or said information-providing-apparatus-located position information by said terminal device on the basis of a judged result when judging the type of information providing apparatus.

19. A control program for a terminal device adapted to run on a computer comprising:
code for acquiring aid information from a plurality of various information providing apparatuses by a terminal device being communicable with said plurality of various information providing apparatuses providing said aid information containing positioning charge information indicative of whether or not a corresponding information providing apparatus indicates position location based on position-relevant signals from positional information satellites;
code for judging the type of information providing apparatus from said corresponding information providing apparatus by said terminal device on the basis of said positioning charge information contained in said aid information;

code for receiving position-relevant signals by said terminal device on the basis of said aid information;

code for generating positioning basis information by said terminal device on the basis of said position-relevant signals;

code for locating a current position by said terminal device on the basis of said positioning basis information to generate terminal-located position information and signal reception time information indicating signal reception times of said position-relevant signals;

code for correcting said positioning basis information by said terminal device to correct said positioning basis information on the basis of said signal reception time information to generate corrected positioning basis information;

code for transmitting said corrected positioning basis information to said corresponding information providing apparatus by said terminal device on the basis of a judged result when judging the type of information providing apparatus;

code for acquiring information-providing-apparatus-located position information by said terminal device, said information-providing-apparatus-located position information being a result of the position location based on said corrected positioning basis information provided by said corresponding information providing apparatus; and code for outputting said terminal-located position information or said information-providing-apparatus-located position information by said terminal device on the basis of a judged result when judging the type of information providing apparatus.

20. A computer-readable medium comprising:

a control program for a terminal device adapted to run on a computer including, code for acquiring aid information from a plurality of various information providing apparatuses by a terminal device being communicable with said plurality of various information providing apparatuses providing said aid information containing positioning charge information indicative of whether or not a corresponding information providing apparatus indicates position location based on position-relevant signals from positional information satellites, code for judging the type of information providing apparatus from said corresponding information providing apparatus by said terminal device on the basis of said positioning charge information contained in said aid information, code for receiving position-relevant signals by said terminal device on the basis of said aid information, code for generating positioning basis information by said terminal device on the basis of said position-relevant signals, code for locating a current position by said terminal device on the basis of said positioning basis information to generate terminal-located position information and signal reception time information indicating signal reception times of said position-relevant signals, code for correcting said positioning basis information by said terminal device to correct said positioning basis information on the basis of said signal reception time information to generate corrected positioning basis information, code for transmitting said corrected positioning basis information to said corresponding information providing apparatus by said terminal device on the basis of a judged result when judging the type of information providing apparatus, code for acquiring information-providing-apparatus-located position information by said terminal device, said information-providing-apparatus-located position information being a result of the position location based on said corrected positioning basis information provided by said corresponding information providing apparatus, and code for outputting said terminal-located position information or said information-providing-apparatus-located position information by said terminal device on the basis of a judged result when judging the type of information providing apparatus.

* * * * *